April 3, 1928.  1,665,054
E. G. CARR
FINISHING MACHINE
Filed May 21, 1923   2 Sheets-Sheet 2
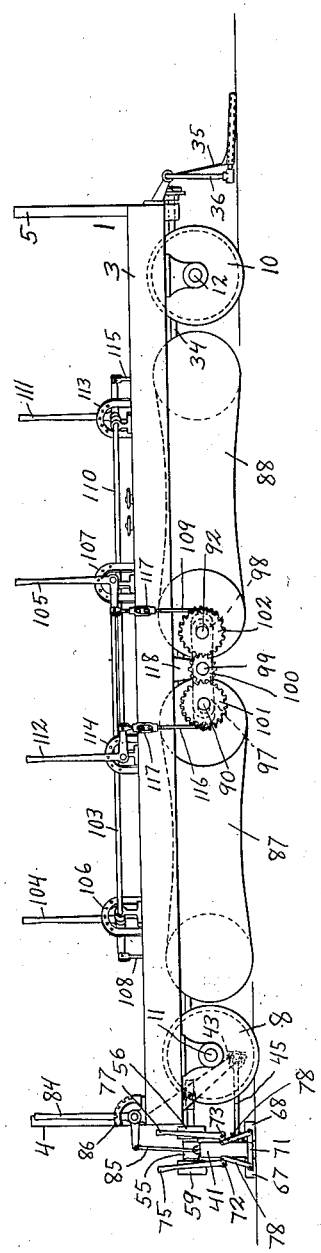
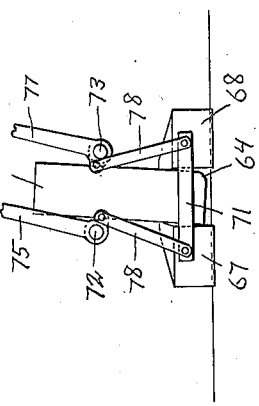
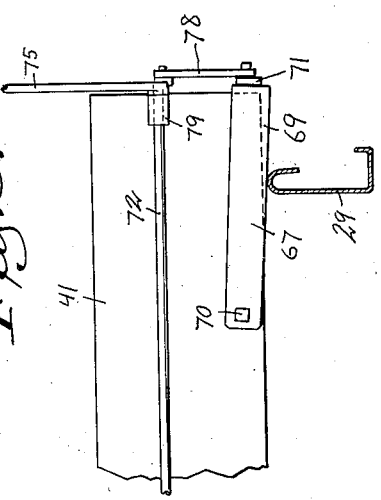
INVENTOR.
Edward G. Carr,
BY
Bottum, Hudnall, Lecher & McNamara,
ATTORNEYS.

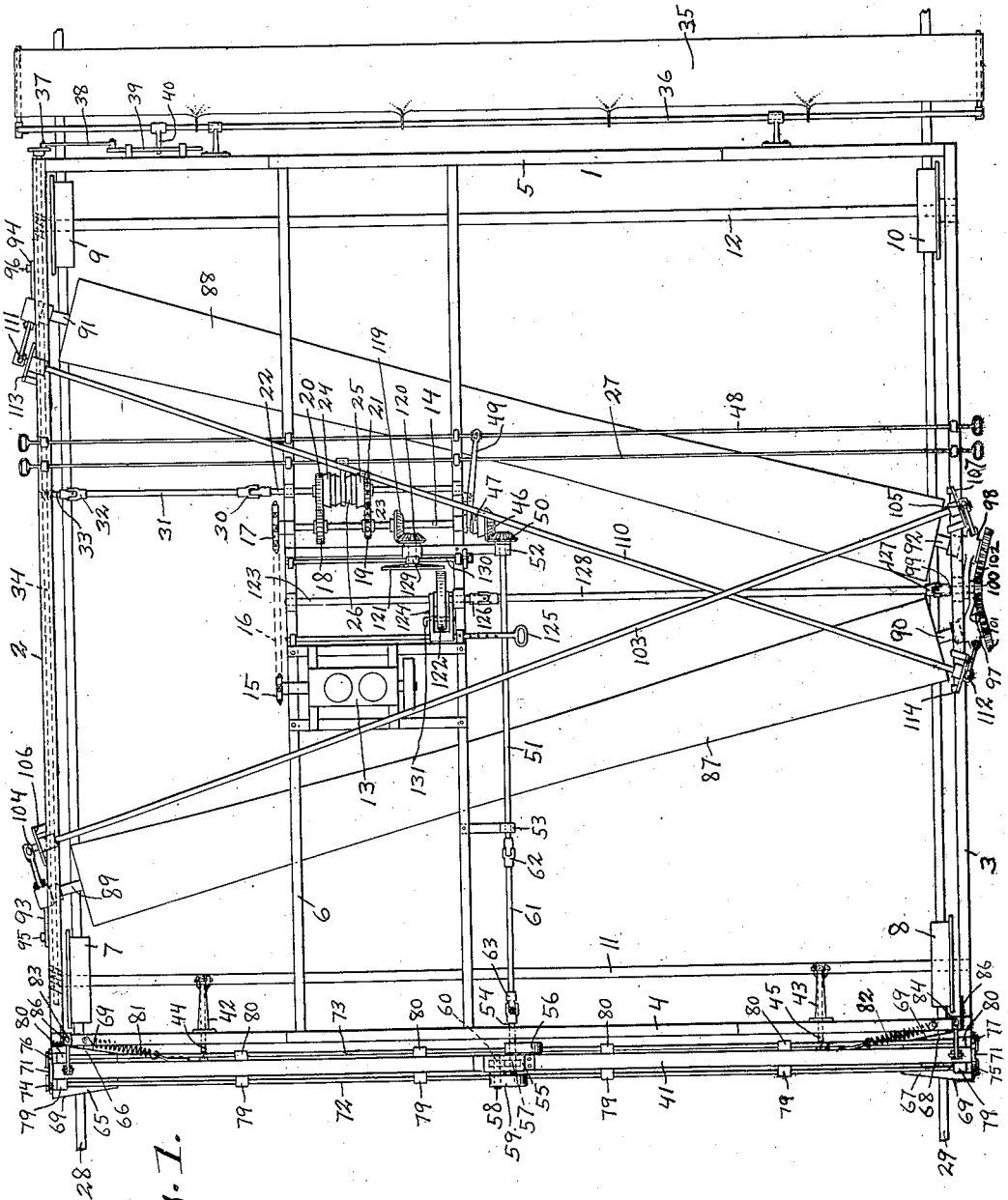

Patented Apr. 3, 1928.

1,665,054

UNITED STATES PATENT OFFICE.

EDWARD G. CARR, OF CHICAGO, ILLINOIS, ASSIGNOR TO THE LAKEWOOD ENGINEERING COMPANY, OF LAKEWOOD, OHIO, A CORPORATION OF OHIO.

FINISHING MACHINE.

Application filed May 21, 1923. Serial No. 640,416.

This invention relates to finishing machines for working concrete, and the object of the invention is to improve the construction and operation of finishing machines in the manner to be hereinafter described and claimed.

Referring to the drawings, which accompany this specification and form a part hereof, which drawings illustrate an embodiment of this invention, and on which drawings the same reference characters are used to designate the same parts in each of the several views, Fig. 1 is a plan view of the machine; Fig. 2 is an elevation of one side of the machine, parts being omitted; Fig. 3 is an elevation, on an enlarged scale, of parts of the machine; and Fig. 4 is an elevation of parts shown by Fig. 3, but looking at the end of the spreading templet.

Referring to the drawings, the reference numeral 1 designates a frame which may be constructed in any suitable manner, the frame illustrated by the drawings being composed of side members 2 and 3, end trusses 4 and 5, and a supporting frame 6 secured to the end trusses 4 and 5. The frame 1 is illustrated as supported by wheels 7, 8, 9 and 10 which are secured, in pairs, to axles 11 and 12. A motor 13 is supported by the supporting frame 6, and can rotate the shaft 14 by means of the sprocket wheel 15, the sprocket chain 16 and the sprocket wheel 17. The motor, 13, shown is an ordinary internal combustion, or gasoline, engine, and turns over in only one direction. A gear 18 and a sprocket wheel 19 are fast upon the shaft 14 and a gear 20 and a sprocket wheel 21 are, supported by the shaft 22 in such a manner as to rotate freely thereon while being restrained from longitudinal movements with respect thereto. The gears 18 and 20 are constantly in mesh with each other and the sprocket wheels 19 and 21 are connected by a straight sprocket chain 23. The gear 20 is provided with a clutch member 24 and the sprocket wheel 21 is provided with a clutch member 25. A clutch member 26 is secured to the shaft 22 in such a manner as to rotate therewith, while being free to be moved longitudinally thereof, and it can be moved by a shifting rod 27 to different positions to either clutch the gear 20 or the sprock t wheel 21 to the shaft 22, or to unclutch both the gear 20 and the sprocket wheel 21 from the shaft 22 when it is moved to an intermediate position. The shaft 22 can propel the machine upon the forms, or rails, 28 and 29 either in a forward direction or in a backward direction, according to whether the clutch member 26 is engaged with the sprocket wheel 21 or with the gear 20, by rotating the wheels 7, 8, 9 and 10 by means of the universal coupling 30, the shaft 31, the universal coupling 32, the shaft 33, gearing, not shown, longitudinal shaft 34, and gear mechanism, not shown, for causing the wheels and their axles 11 and 12 to be rotated by the longitudinal shaft 34. A float 35 is supported by a frame 36 at the rear of the machine and can be reciprocated transversely with respect to the machine by a crank 37 on the longitudinal shaft 34, and a connecting rod 38 which reciprocates a slide 39 to which the frame 36 can be connected by the member 40. The float 35 and the frame 36 can be turned up out of the way when the machine is to be moved backward in the manner which is common and well-known in my concrete road machines which are in use throughout the United States.

A spreading templet 41 is located at the front of the machine. Brackets 42 and 43 are secured to the end truss 4 and brace rods, or radius rods, 44 and 45 are pivoted to these brackets and to the spreading templet 41, with their pivots extending vertically, as clearly shown by Fig. 1 of the drawings so that the spreading templet can be reciprocated transversely with respect to the machine. A bevel gear 46, provided with a clutch member, is loose upon the shaft 14 but is restrained from longitudinal movement with respect thereto, and a clutch member 47 is secured to the shaft 14 so as to rotate therewith while being free to be moved longitudinally thereof. A shifting rod 48 is secured to a shifting lever 49 for clutching the bevel gear 46 to the shaft 14 or unclutching it therefrom. The bevel gear 46 meshes with a bevel gear 50 which is fast on the shaft 51. The shaft 51 is supported in bearings 52 and 53. A short shaft 54 is retained in a bearing 55 which is secured to the spreading templet 41, and the shaft 54 has secured thereto an eccentrically mounted weight 56 and a gear 57. A second short shaft 58 is also mounted in the bearing 55 and has secured thereto an eccentrically mounted weight 59 and a gear 60. The gears 57 and 60 mesh with each other and the eccentrically mounted weights 56 and 59 are so disposed that they will extend horizontally in the same directions from their shafts 54 and 58, as clearly shown by Fig. 1 of the drawings, but will extend in opposite directions from their shafts vertically, as their shafts are rotated. The gears 57 and 60 are of the same size and the action of the weights 56 and 59 is to move the spreading templet 41 horizontally while preventing, or avoiding, up or down movements of the spreading templet 41. The shaft 51 is connected with the shaft 54 by means of a shaft 61 and universal couplings 62 and 63 so that the shaft 61 can be free to move with movements of the spreading templet 41. All of the universal couplings hereinbefore mentioned or hereinafter referred to are of the well-known constructions which not only compel positive rotations but also permit of sufficient longitudinal movements of shafts as required by the various angular relations which may be assumed by shafts.

Provision is made for tilting the spreading templet so that either its front edge can be elevated with respect to its rear edge or its rear edge can be elevated with respect to its front edge and it is preferred that the rear part of the bottom of the spreading templet be curved upwardly, to the rear, as clearly shown at 64 by Fig. 4 of the drawings. Shoes 65, 66, 67, and 68 are pivoted near the ends of the spreading templet, and far enough inside the ends of the spreading templet to afford the amount of tilting desired. These shoes are intended to rest upon and slide upon the forms 28 and 29 and may be provided with wedge-shaped parts 69 to sweep concrete mortar off from the forms and inside the same, while preventing concrete mortar from being swept over to the outsides of the forms. The reference numeral 70 designates bolts on which the shoes are pivoted to the spreading templet. The outer ends of each pair of shoes are pivotally connected by a link 71 to prevent any tendency for the shoes to spread apart, and the shoes overlap the sides of the spreading templet so that the shoes in advance of the spreading templet are pushed along by the spreading templet while the links 71 drag the shoes which are in the rear of the spreading templet. Rock shafts 72 and 73 are suitably supported by the spreading templet, and bell-crank levers 74 and 75 are secured to the rock shaft 72, and bell-crank levers 76 and 77 are secured to the rock shaft 73. A link 78 is pivotally connected with a bell-crank lever and a shoe and it will be readily seen, by reference to Fig. 4 of the drawings, that a clockwise movement of the rock shaft 72 will tilt the sharp edge of the spreading templet upwardly, and that a counter-clockwise movement of the rock shaft 73 will tilt the curved edge of the spreading templet upwardly, and that reverse movements of the rock shafts 72 and 73 would lower the respective edges of the spreading templet. The rock shafts 72 and 73 may be retained in their predetermined positions by friction within one or more of their respective bearings 79 and 80, or in any other suitable and convenient manner. Springs 81 and 82 are connected to the end truss 4 and the spreading templet 41 to tend to center the spreading templet and one of these springs is put under tension whenever the spreading templet is moved horizontally from its central position and acts to increase the rapidity of movement of the spreading templet on its return movement. Bell-crank levers 83 and 84 are pivotally supported upon the end of the frame 1 and are connected by links 85 with the spreading templet 41 to lift the spreading templet away from the concrete or to lower it into working position. The bell-crank levers 83 and 84 are provided with hand grips and pawls, not shown, and the pawls can be engaged with notched sectors 86 to hold the spreading templet in the positions desired. The links 85 are connected to the bell-crank levers 83 and 84 and to the spreading templet 41 in such a manner as to permit the spreading templet to be free to be moved back and forth horizontally.

The machine is provided with rollers 87 and 88 which are disposed obliquely with respect to each other and with respect to the spreading templet 41 and the float 35, in the specific arrangement of these parts as shown by the drawings. These rollers are tapering and smaller in the center than at their ends to correspond with the crown of a road, and they are provided with trunnions 89, 90, 91, and 92. The trunnions 89 and 91 are supported in link bearings 93 and 94 which are pivoted to the side member 2 by pivots 95 and 96, and the trunnions 90 and 92 are supported in link bearings 97 and 98 which are pivoted on the short shaft 99 to which is secured the gear 100 which meshes with the gears 101 and 102 which are secured to the trunnions 90 and 92, respectively. A rock shaft 103 is journaled on the side members 2 and 3 and is provided with bell-crank levers 104 and 105 which may be retained in desired positions by pins passed through holes therein and holes in sectors 106 and 107. The bell-crank lever 104 is connected with the link bearing 93 by a link 108 and the bell-crank lever 105 is connected with the bell-crank lever 98 by the link 109. A rock shaft 110 is journaled on the side bars 2 and 3 and is provided with bell-crank levers 111 and 112 which may be retained in desired positions by pins passed through holes therein and holes in sectors 113 and 114. The bell-crank lever 111 is connected with the link bearing 94 by a link 115 and the bell-crank lever 112 is connected with the link bearing 97 by the link 116. The links 108, 109, 115, and 116 are illustrated as including turnbuckles 117 so that these links may be shortened or lengthened. The short shaft 99 is supported by a bearing 118 secured to the side member 3, and it will be readily apparent that the forward ends, or leading ends, of the rollers 87 and 88 can be raised or lowered simultaneously by the rock shaft 103, while the rear, or trailing ends, of the rollers can be raised or lowered simultaneously by the rock shaft 110.

A bevel gear 119 is secured to the shaft 14 and meshes with a bevel gear 120 which is secured to a short shaft to which a friction disk 121 is also secured. A friction wheel 122 is secured to a shaft 123 so as to rotate the same while being movable longitudinally thereof, and is embraced by a yoke 124 so that it may be moved to different positions on the shaft 123 which is parallel with the face of the friction disk 121. The yoke 124, and the friction wheel 122, may be moved by the bar 125 and may be retained in the desired position by a pin inserted in a hole in the supporting frame 6 and engaged within the proper hole in the bar 125. The shaft 123 can drive the short shaft 99 through the universal couplings 126 and 127 and the shaft 128. Any suitable means may be provided for disengaging the friction wheel 122 from the friction disk 121, either while shifting the friction wheel 122 or for preventing the friction wheel 122 from being driven by the friction disk 121. The specific mechanism illustrated by the drawings for this purpose consists of a wedge member 129 which can be moved by rod 130 to press the friction disk 121 into engagement with the friction wheel 122 or to release it from such engagement.

The operation of the machine is as follows. Looking at Fig. 1 of the drawings and with the machine moving in the forward direction, that is, toward the left hand, the spreading templet 41 will be lowered and will be reciprocated horizontally by the action of the weights 56 and 59 and the springs 81 and 82. The leading ends of the rollers 87 and 88 will be lowered and their trailing ends will be raised and they will be rotating in directions opposite to the directions in which freely rotatable wheels would rotate. The effect is to smooth the concrete and cement mortar and carry along excess to fill hollows, at the same time forcing concrete from each side of the road towards the center to form and maintain the crown of the road. Lastly, the float 35 is reciprocated across the surface to finish the same. Now, concrete which can be finished without tamping must be pretty wet or mushy and different parts of the concrete may vary considerably in consistency. For example, a stiffer lot may be encountered and the spreading templet can be tilted so as to raise its rear edge. Its sharp front edge will now act somewhat on the order of a cutting tool to better nudge the concrete. If, however, the concrete be soft and mushy, with plenty of water and cement mortar, it will be advisable to resort simply to a smoothing effect by tilting up the front edge of the spreading templet and let its rear curved portion pass over the concrete with a smoothing action. The rollers 87 and 88 can be run at different speeds of rotation either against the direction of travel of the machine or with the direction of travel of the machine, or can be allowed to rotate simply by frictional contact with the concrete, and their angles of vertical inclination can be altered. If a patch of concrete is not satisfactory after one passage of the machine, the machine can be reversed and the oblique position of the rollers will maintain the crown of the road. When the machine is run backwards, the float 35 and its frame 36 should be turned up out of the way, and, ordinarily, the spreading templet should be raised.

The rollers 87 and 88 can, of course, be positioned with their ends in a horizontal plane and, as the rollers illustrated by the drawings are smaller at their centers to correspond with the crown of a road, the rollers can be used in such positions to sweep or roll water from the surface of the concrete, either with the rollers rotating or not rotating.

To prevent the rollers 87 and 88 from being rotated by frictional contact with the concrete, any suitable locking means may be provided to prevent such rotation, the drawings illustrating a pin 131 which may be inserted through the arms of the yoke 124 and the friction wheel 122, suitable holes being provided for this purpose in the arms of the yoke to align with a hole in the friction wheel 122.

By locking the rollers 87 and 88, to prevent their rotation while, of course, the friction disk 121 is disengaged from the friction wheel 122, the rollers 87 and 88 become, in effect, templets with rounded lower edges of the same general character as the spreading templet 41 when tipped or tilted to present its curved part 64 to the concrete.

What is claimed is:

1. In a finishing machine, the combination with a frame, of a spreading templet, means to reciprocate the spreading templet longitudinally, and means for tilting the spreading templet.

2. In a finishing machine, the combination with a frame, of a spreading templet provided with a sharp edge and a rounded rear edge, and means for tilting the spreading templet to present either its sharp edge or its rounded rear edge to concrete.

3. In a finishing machine, the combination with a frame, of rollers disposed obliquely with respect to the frame and with respect to each other, each roller extending across the entire width of the concrete to be finished, and means for changing the elevations of the ends of the rollers, so that either roller can operate upon either side of a road.

4. In a finishing machine, the combination with a frame, of rollers disposed obliquely with respect to the frame and with respect to each other, each of said rollers extending entirely across the concrete to be finished, and means for rotating said rollers positively at the same speed and adapted to permit changes in the speed of rotation of said rollers.

5. In a finishing machine, the combination with a frame adapted to be moved, of a roller carried by the frame and adapted to be rotated, and means to prevent the rotation of said roller when it is in contact with the concrete to cause said roller to act upon the concrete as a fixed templet with a rounded lower edge, when the frame is moved with respect to the concrete.

6. In a finishing machine, the combination with a movable frame, of divergent rollers, extending clear across the machine, and independently supported at their ends, means for simultaneously changing the elevation of the end of one roller and the opposite end of the other roller, and means for simultaneously changing the elevations of the other ends of the rollers.

7. In a finishing machine, the combination with a frame, of divergent rollers, extending clear across the concrete to be finished, and means for moving an end of one roller up or down while moving the remote end of the other roller in the reverse down or up direction.

8. In a finishing machine, the combination with a movable frame, of divergent finishing rollers extending clear across the concrete to be finished, said rollers increasing in diameter from their centers to their ends, and means for positively rotating said rollers in the same direction of rotation.

In witness whereof I hereto affix my signature.

EDWARD G. CARR.